(12) United States Patent
Berstis et al.

(10) Patent No.: US 8,943,435 B2
(45) Date of Patent: *Jan. 27, 2015

(54) PHONE SERVICE MENUS

(71) Applicant: International Business Machines Corporation, Armonk, NY (US)

(72) Inventors: Viktors Berstis, Austin, TX (US); Candice B Gilzean, Austin, TX (US); Sonia M Gaillard, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 12 days.

This patent is subject to a terminal disclaimer.

(21) Appl. No.: 13/861,952

(22) Filed: Apr. 12, 2013

(65) Prior Publication Data

US 2013/0239064 A1    Sep. 12, 2013

Related U.S. Application Data

(63) Continuation of application No. 11/348,900, filed on Feb. 7, 2006, now Pat. No. 8,453,071.

(51) Int. Cl.
 *G06F 3/0482* (2013.01)
 *G06F 17/30* (2006.01)

(52) U.S. Cl.
 CPC ........ *G06F 3/0482* (2013.01); *G06F 17/30882* (2013.01); *G06F 17/30899* (2013.01)
 USPC .......................................................... 715/810

(58) Field of Classification Search
 CPC combination set(s) only.
 See application file for complete search history.

(56) References Cited

U.S. PATENT DOCUMENTS

| | | | |
|---|---|---|---|
| 4,734,858 A | 3/1988 | Schlafly | |
| 6,088,435 A * | 7/2000 | Barber et al. | 379/205.01 |
| 6,327,347 B1 | 12/2001 | Gutzmann | |
| 6,507,727 B1 | 1/2003 | Henrick | |
| 6,570,967 B2 | 5/2003 | Katz | |
| 6,754,181 B1 | 6/2004 | Elliott et al. | |
| 6,842,767 B1 * | 1/2005 | Partovi et al. | 709/203 |
| 7,039,041 B2 * | 5/2006 | Robohm et al. | 370/352 |
| 7,116,996 B2 * | 10/2006 | Lazaro et al. | 455/466 |
| 7,412,525 B2 * | 8/2008 | Cafarella et al. | 709/229 |
| 7,697,673 B2 * | 4/2010 | Chiu et al. | 379/114.13 |
| 2003/0147518 A1 * | 8/2003 | Albal et al. | 379/207.15 |

* cited by examiner

*Primary Examiner* — Phenuel Salomon
(74) *Attorney, Agent, or Firm* — Robert C. Rolnik

(57) ABSTRACT

A method for receiving from a customer, customer subscription data at a menu tree service center prior to receiving a customer request from the customer, wherein the customer subscription data comprises at least one linked customer number linked to a spoken word or phrase. The method sends a service provider request for the linked customer number to the customer via the menu tree service center. The method receives a verbal response from the customer at the menu tree service center, wherein the verbal response comprises the spoken word or phrase. The method retrieves the linked customer number from the menu tree service center server based on the verbal response. The method sends the linked customer number to the service provider.

12 Claims, 5 Drawing Sheets

100

PHONE SERVICE MENUS

BACKGROUND

This invention relates generally to methods of communication with a service provider. In particular, the invention relates to facilitating the use of service provider menu trees.

Menu trees are well known to anyone who has attempted to contact a utility company or financial institution in order to request service or pay a bill. Often, the menu trees are lengthy, consisting of several layers (or branches) of options that must be navigated in order to reach the desired destination. Each layer navigated offers yet more options until either the destination is reached or the customer gives up. This takes time and may use up valuable cellular phone minutes for customers with mobile communication devices. This is even more frustrating when the customer is not provided an option to skip layers or go directly to the desired option.

Menu trees are often used by service providers to present to a customer a variety of options from which to choose in order to narrow the scope of the customer's call or to direct the customer to a specific department within the service provider. Customers use menu trees to perform such tasks as, paying a bill or ordering goods and services. Often during the navigation of the menu tree the customer is prompted to enter or recite information such as identification numbers, addresses, and telephone numbers. Many times, this information is of a sensitive nature such as, for example, credit card numbers and expiration dates, social security card numbers and personal identification numbers (PINs). When out in public, the customer would prefer that the information is not overheard by those in close proximity to the customer as the information is provided.

It is therefore desirable to provide a method and system for facilitating the navigation of service provider menu trees that overcomes the limitations, challenges, and obstacles described above.

BRIEF SUMMARY

One aspect of the present invention provides a method for facilitating menu tree options at a menu tree facilitator. The method of facilitating menu tree options at a menu tree facilitator includes the steps of receiving a customer request from a customer at a menu tree service center, the request including a customer identification, and determining one menu tree from a plurality of menu trees based on the customer request, wherein each of the plurality of menu trees is associated with a service provider. The method further includes the steps of determining at least a portion of the determined menu tree based on the customer request and sending the portion of the determined menu tree to the customer based on the determination.

Another aspect of the present invention provides a computer readable medium including computer readable code for facilitating menu tree options. The computer medium includes computer readable code for receiving a customer request from a customer at a menu tree facilitator, computer readable code for determining at least a portion of a menu tree of a service provider based on the customer request, and computer readable code for sending the portion of the menu tree to the customer based on the determination, wherein the menu tree facilitator is separate from the service provider.

A third aspect of the present invention provides a system for facilitating menu tree options. The system includes means for receiving a customer request from a customer at a menu tree facilitator, means for determining at least a portion of a menu tree of a service provider based on the customer request and means for sending the portion of the menu tree to the customer based on the determination, wherein the menu tree facilitator is separate from the service provider.

The aforementioned and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION

Figure 1:
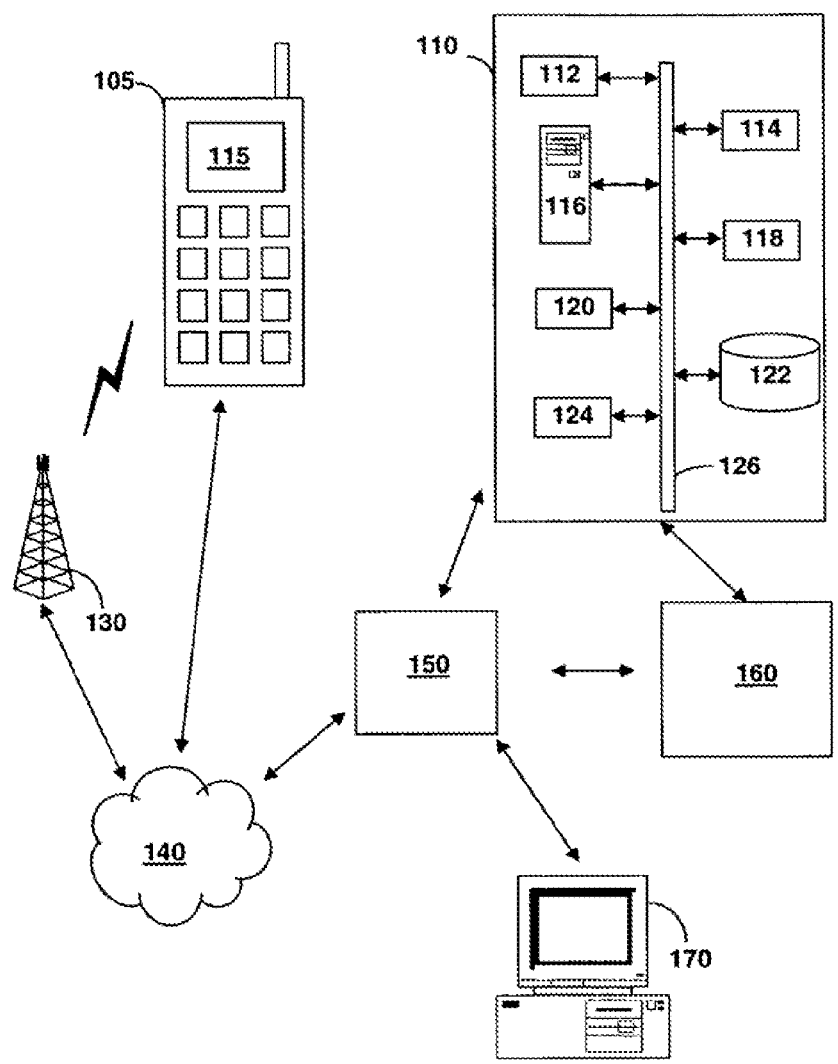
FIG. 1 is a schematic diagram of one embodiment of a system for facilitating the use of menu trees in accordance with the present invention.

FIG. 1 illustrates an exemplary network system 100. Network system 100 is illustrative only, and is not an architectural limitation for the practice of this invention. Network system 100 may include permanent connections, such as wire or fiber optic cables, or temporary connections made through telephone connections. FIG. 1 illustrates one embodiment of a system for facilitating the use phone service menus in accordance with the present invention at 100.

System 100 includes communication device 105, one or more menu tree service centers (MTSC) 10; one or more wireless carrier systems 130; one or more communication networks 140; one or more land networks 150; and one or more service providers 160. In one embodiment, system 100 also includes one or more client, personal, or user computers 170. System 100 may include additional components not relevant to the present discussion.

In one embodiment, communication device 105 is implemented as a mobile communication device equipped with suitable hardware and software for transmitting and receiving voice and data communications. In one embodiment, communication device 105 is a cellular phone such as, for example, an analog, digital, dual-mode, dual-band, multi-mode or multi-band cellular phone. In one embodiment, communication device 105 includes a display 115. In another embodiment, mobile communication device 105 is implemented as a personal digital assistant (PDA).

Communication device 105 sends and receives radio transmissions from wireless carrier system 130. Wireless carrier system 130 is implemented as any suitable system for transmitting a signal from a mobile communication device 105 to communication network 140.

Communication network 140 includes services from one or more mobile telephone switching offices and wireless networks. Communication network 140 connects wireless carrier system 130 to land network 150. Communication network 140 is implemented as any suitable system or collection of systems for connecting wireless carrier system 130 to communication device 105 and land network 150.

Land network 150 connects communication network 140 to MTSC 110, service provider 160 and computer 170. In one embodiment, land network 150 is a public-switched telephone network (PSTN). In another embodiment, land network 150 is implemented as an Internet protocol (IP) network. In other embodiments, land network 150 is implemented as a wired network, an optical network, a fiber network, other wireless networks, or any combination thereof. Communication network 140 and land network 150 connect wireless carrier system 130 to MTSC 110, and service provider 160.

MTSC 110 includes hardware and software for sending and receiving data and voice communications. In one embodiment, MTSC 110 includes processor 124, one or more data modems 112, one or more voice and data switches 114, one or more servers 116, one or more communication services managers 118, one or more databases 122, one or more menu services advisors 120, and network system 126. MTSC 110 is connected directly by wire to service provider 160, or connected by phone lines to land network 150, which is connected to service provider 160. In an example, MTSC 110 is connected to service provider 160 utilizing an IP network. Land network 150 sends digital data to and receives digital data from modem 112, data that is then transferred to server 116. Land network 150 transmits data communications between MTSC 110 and service provider 160.

Processor 124 controls communications between communication device 105, wireless carrier system 130, and service provider 160. In one embodiment, a voice-recognition application is installed in processor 124 that can translate human voice input received from communication device 105 to digital signals. Processor 124 generates and accepts digital signals transmitted between communication device 105 and MTSC 110.

MTSC 110 receives menu service request data from user computer 170 via land network 150. In alternative embodiments, computer 170 includes a wireless modem to send data to MTSC 110 through a wireless communication network 140 and a land network 150. Data is received by land network 150 and sent to one or more servers 116. In one embodiment, server 116 is implemented as any suitable hardware and software capable of providing web services to transmit menu service requests from a client at computer 170 to service provider 160. Server 116 sends data transmissions to or receives data transmissions from one or more databases 122 via network system 126. Server 116 includes computer applications and files for managing and storing menu service requests, subscriber information, and subscriber authentication information.

Switch 114 of MTSC 110 connects to land network 150. Switch 114 transmits voice or data transmissions from MTSC 110 and receives voice or data transmissions from communications device 105 through wireless carrier system 130, communication network 140, and land network 150. Switch 114 receives data transmissions from and sends data transmissions to one or more service provider 160.

Communication services manager 118 is any suitable hardware and software capable of providing requested menu services to communications device 105. Communication services manager 118 sends data transmissions to or receives data transmissions from one or more communication services databases 122 via network system 126. Communication services database 122 sends data transmissions to or receives data transmissions from menu services advisor 120 via network system 126.

Communication services manager 118 provides one or more of a variety of services, including enrollment services and menu tree request services. Communication services manager 118 receives menu service requests from the client via computer 170, server 116, and land network 150. Communication services manager 118 transmits menu text data to mobile communication device 105 through wireless carrier system 130, communication network 140, land network 150, voice and data switch 114, and network system 126. Communication services manager 118 stores or retrieves data and information from communication services database 122. Communication services manager 118 can provide requested information to menu services advisor 120.

In one embodiment, menu services advisor 120 is implemented as a real advisor. In an example, a real advisor is a human being in verbal communication with a user or subscriber (e.g., a client) in mobile communications device 105. In another embodiment, menu services advisor 120 is implemented as a virtual advisor. In an example, a virtual advisor is implemented as a synthesized voice interface responding to requests from mobile communications device 105.

Service provider 160 includes hardware and software for communicating with MTSC 110, communication device 105 and client computer 170. In one embodiment, service provider 160 includes communication hardware and software suitable for wired or wireless communication with MTSC 110, mobile communication device 105 and client computer 170. Service provider 160 may be any type of real or virtual facility that provides goods and/or services. Service provider 160 may be, for example, a utility company, a department store, a bank a credit card company or a restaurant.

Client, personal, or user computer 170 includes a computer usable medium to execute Internet browser and Internet-access computer programs for sending and receiving data over land network 150 and, optionally, wired or wireless communication networks 140 to MTSC 110. The term "computer-readable storage device" does not encompass a signal propagation media such as a copper cable, optical fiber or wireless transmission media. Computer 170 sends service requests to MTSC 110 through a web-page interface using communication standards such as hypertext transport protocol (HTTP), and transport-control protocol and Internet protocol (TCP/IP). In operation, a client utilizes computer 170 to initiate an intermediate menu service request. Subscriber menu service request data from client-side software is transmitted to server-side software of MTSC 110. Subscriber menu service request data is stored at MTSC 110.

Figure 2:
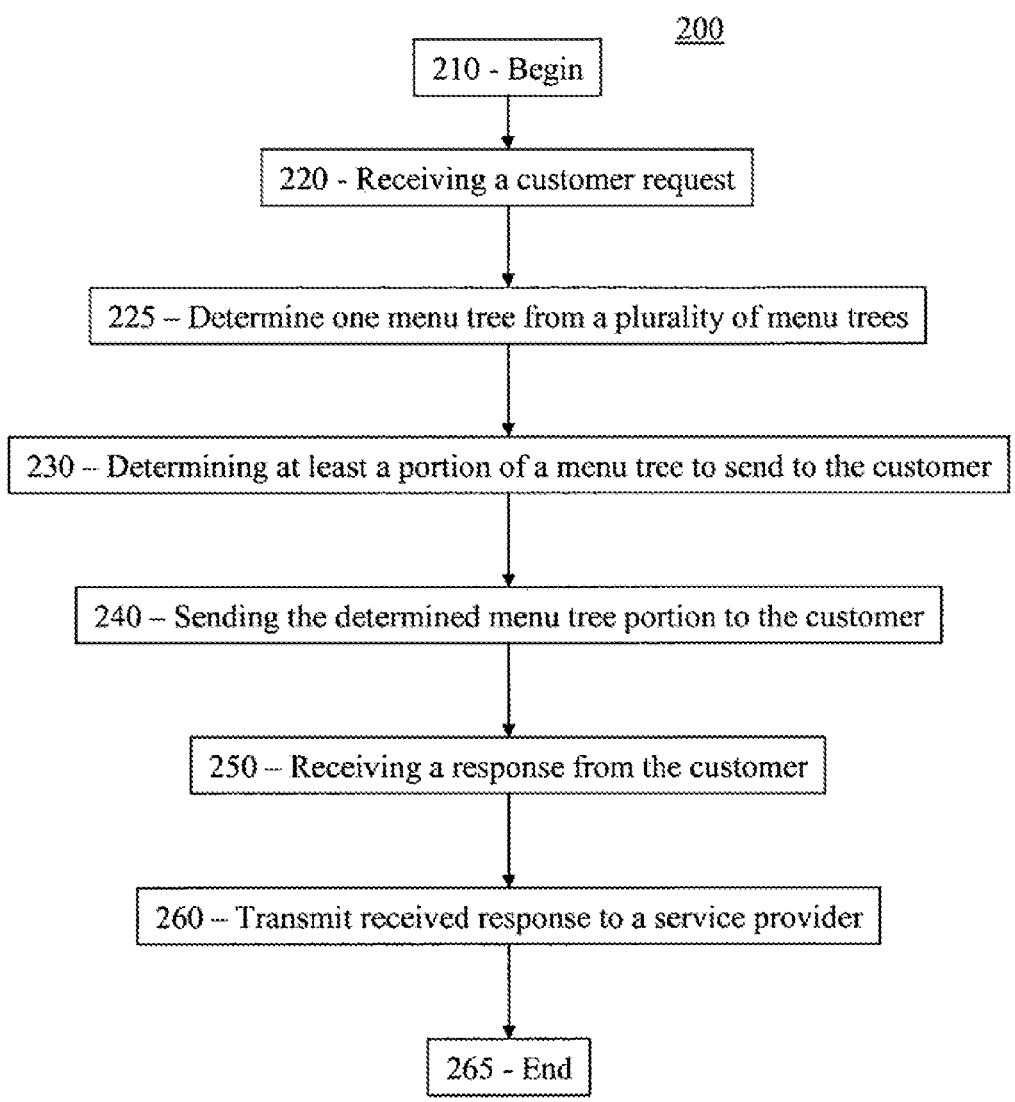
FIG. 2 is a flowchart representative of one embodiment of a method for facilitating the use of menu trees in accordance with the present invention.

FIG. 2 illustrates a flowchart representative of one embodiment of a method 200 for facilitating menu tree options of a service provider. Menu tree service center (MTSC) 110 acts as an intermediary between the customer and the service provider. In one embodiment, method 200 may be implemented using system 100 illustrated in FIG. 1. Method 200 begins at step 210.

Method 200 receives a customer request from a customer at a MTSC server, at step 220. In one embodiment, the customer request is received from a customer via a mobile communication device 105. In one embodiment, the customer request includes a customer identification number. The customer identification number may be, for example, the telephone number from which the customer request is made or a personal identification (PIN) number.

In another embodiment, the customer request includes a service provider indicator. In one embodiment, the service provider indicator may be, for example, a predetermined code number specific for a service provider. In one embodiment, the customer enters this predetermined code number when making the request. In one embodiment, the predetermined code number may be entered into the request as a telephone extension number. In another embodiment, the communication device may be configured to speed dial the MTSC number followed by the predetermined code number. In yet another embodiment, the customer makes the request via a live agent and verbalizes the service provider name and/or predetermined code number.

Next, MTSC determines one menu tree from a plurality of menu trees based on the customer request, at step 225. In one embodiment, MTSC includes a plurality of menu trees from at least one service provider. In another embodiment, MTSC includes a plurality of menu trees from a single service provider.

Figure 3:
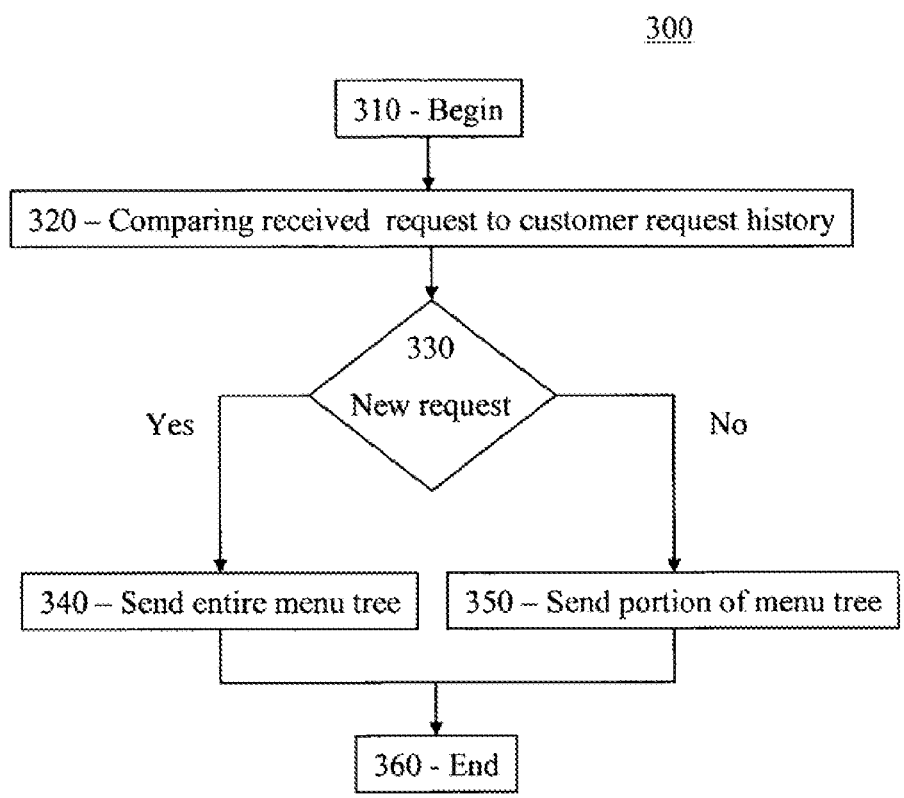
FIG. 3 is a flowchart representative of one embodiment of a method for facilitating the use of menu trees in accordance with the present invention.

At step 230, MTSC determines at least a portion of the determined menu tree to be sent to the customer based on the received customer request. FIG. 3 illustrates a method 300 of determining the portion of the menu tree to send to the customer in response to the customer request. Method 300 begins at 310.

At step 320, the received customer request is compared to the customer request history. In one embodiment, MTSC retrieves from the MTSC server the customer request history that corresponds to the received customer identification number.

At step 330, based on the comparison, a determination is made as to whether the received customer request is a new request or the same as a prior request. If the comparison determines that the request is a new request, the entire menu is sent to the customer, step 340. If the comparison determines that the request is not a new request, a portion of a menu tree is sent to the customer. Method 300 ends at 360.

In another embodiment, the MTSC determines from the customer that the current request is the same as a previous request. In this embodiment, the customer may verbalize whether or not the request is a new request in response to a prompt from a real or virtual agent.

Returning to method 200, at step 240, at least a portion of the service provider menu tree is sent to the mobile communication device based on the determination from step 230. In one embodiment, the portion of the menu tree is sent to the mobile communication device as a text display. In one embodiment, the menu is sent as a wml text menu for display to the customer. In another embodiment, the determined portion of the service provider menu is sent as an audible file to a mobile communication device that does not have text display capabilities. In other embodiments, the menu is sent as an html or xml file.

In one embodiment, the portion of a menu tree that is sent to the customer is the entire menu based on the determination that the customer request is a new request. The entire menu may be sent all at once to the communication device or in pieces. In one embodiment the pieces correspond to individual layers of a multilayer menu tree. In one embodiment, the layers of a multilayer menu tree are presented to the customer one layer at a time.

In another embodiment, a portion of a menu tree is sent to the customer based on the determination that the customer request is the same as a previous request. In situations where the current customer request is for the same provider, the MTSC may send the customer a text display corresponding to the final destination of the previous customer request, thereby bypassing those menu tree layers and options that occur prior to the final menu destination. Presenting the final destination of a prior request saves the customer time by eliminating the necessity of navigating menu items already traversed.

In another embodiment, the text display may include an option to present the entire menu when only a portion was sent based on the determination that the request is the same as a previous request. The customer may select this option when the final destination is different than the previous request.

At step 250, the MTSC receives at least one response from the mobile communication device based on the sent menu tree. In one embodiment, a customer views the text menu displayed at the mobile communication device and selects a menu tree option by, for example, pressing a button corresponding to a particular menu item. In another embodiment, the customer selects a particular menu item verbally by speaking to a menu service advisor.

In one embodiment, MTSC monitors and records the navigation of the menu tree as the customer proceeds through the menu tree for the first time and responds to the menu options presented. In one embodiment, the menu presented is a multilayer menu. For each layer presented, the customer makes a selection and proceeds to the next layer until the requested service is presented and chosen by the customer. The MTSC then stores this recorded information as a navigation record. In one embodiment, the menu tree facilitator service stores the navigation record in a customer specific database that may be accessed the next time the customer requests menu tree facilitation services for the same destination of a service provider menu tree. In this embodiment, the navigation record is linked to the customer identification number. In another embodiment, the navigation record and service provider menu are stored in a database that may be utilized by other customers/subscribers that request menu tree facilitator service for the same target destination of a service provider menu tree.

At step 260, the received response is transmitted to the service provider, thereby connecting the customer to the service provider at the desired menu item. In one embodiment, when the customer chooses from the text display, the menu tree facilitator service sends several DTMF tones with timing delays between them, if needed, to get the customer to the final destination at the service provider without the need for the customer to listen to all of the intermediate steps of the menu tree. Method 200 ends at step 265.

Figure 4:
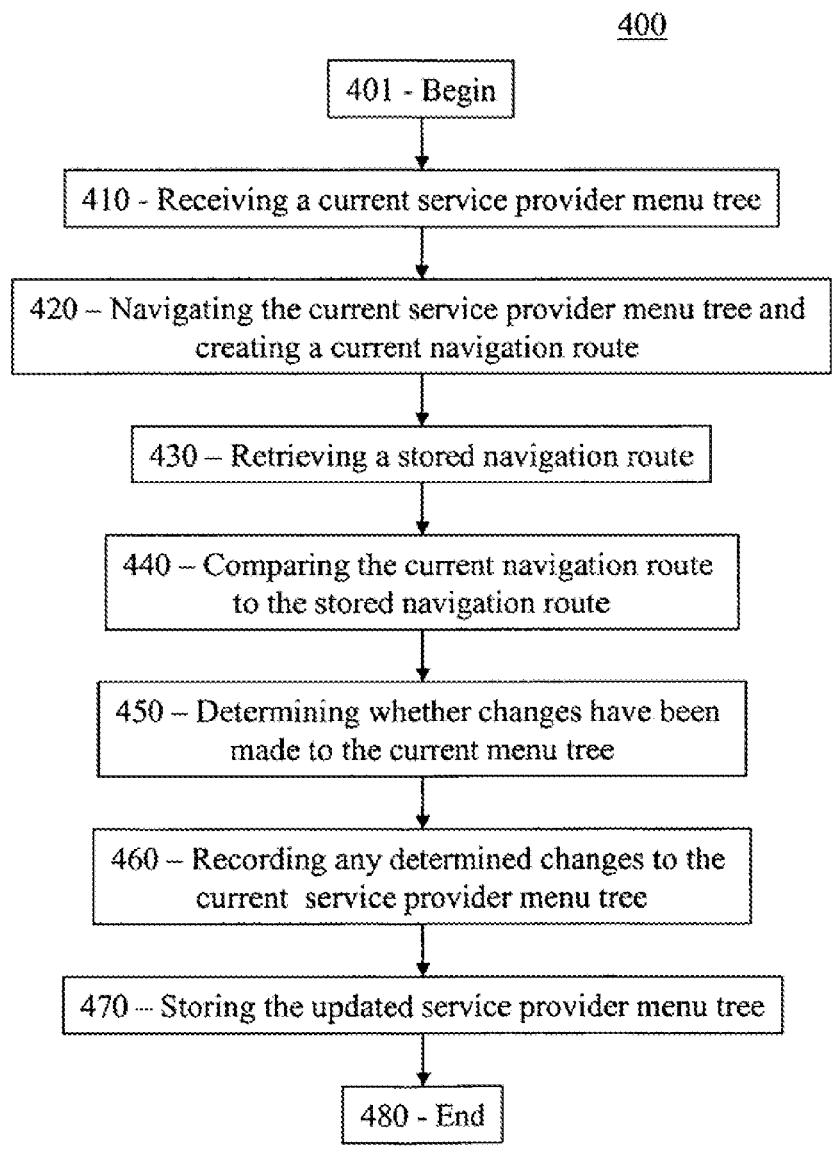
FIG. 4 is a flowchart representative of one embodiment of a method for facilitating the use of menu trees in accordance with the present invention.

FIG. 4 illustrates a method 400 for maintaining service provider menu trees at a menu tree service center. In one aspect of the invention, MTSC periodically navigates service provider menu trees to determine whether changes have been made to the menu trees that would affect the navigation to a target destination. In one embodiment, the determination is made by comparing a current version received from a service provider with a version stored at the MTSC for reaching the same target destination. Method 400 begins at 401.

MTSC receives a current menu tree version from a service provider at step 410. In one embodiment, the current menu tree version is received directly from a service provider in response to a request from the MTSC.

At step 420, MTSC navigates the current menu tree version to reach a predetermined target destination, such as, for example, a bill paying option and creates a current navigation route. At step 430, MTSC retrieves a stored navigation route from the MTSC server. In one embodiment, the stored navigation route comprises a navigation route to the same target destination for the same service provider as that of the current menu tree. At step 440, MTSC compares the navigation route of the current menu tree to the stored navigation route. Based on this comparison, at step 450, MTSC determines whether or not at least one change has been made to the current menu tree and, thus, the path to the final destination. If no change is detected along the navigation route to the final destination of the current menu tree, method 400 ends at 480. However, if a change is detected at step 440, MTSC records the detected change(s) and follows the new path to the final destination, step 460. At step 470, the recorded menu tree is stored in the menu tree facilitator database as an updated menu tree. The updated menu tree replaces the prior version of the menu tree so that the navigation to the final destination during a subsequent customer request is seamless. Method 400 ends at 480.

In another embodiment, a service provider may subscribe to the menu tree facilitator service and provide an updated menu tree on an as needed basis, thereby eliminating the need for the menu tree facilitator service to periodically explore the menu trees offered to their subscribers. In another embodiment, the user could also subscribe to have their favorite and/or most often used menu points automatically updated.

Figure 5:
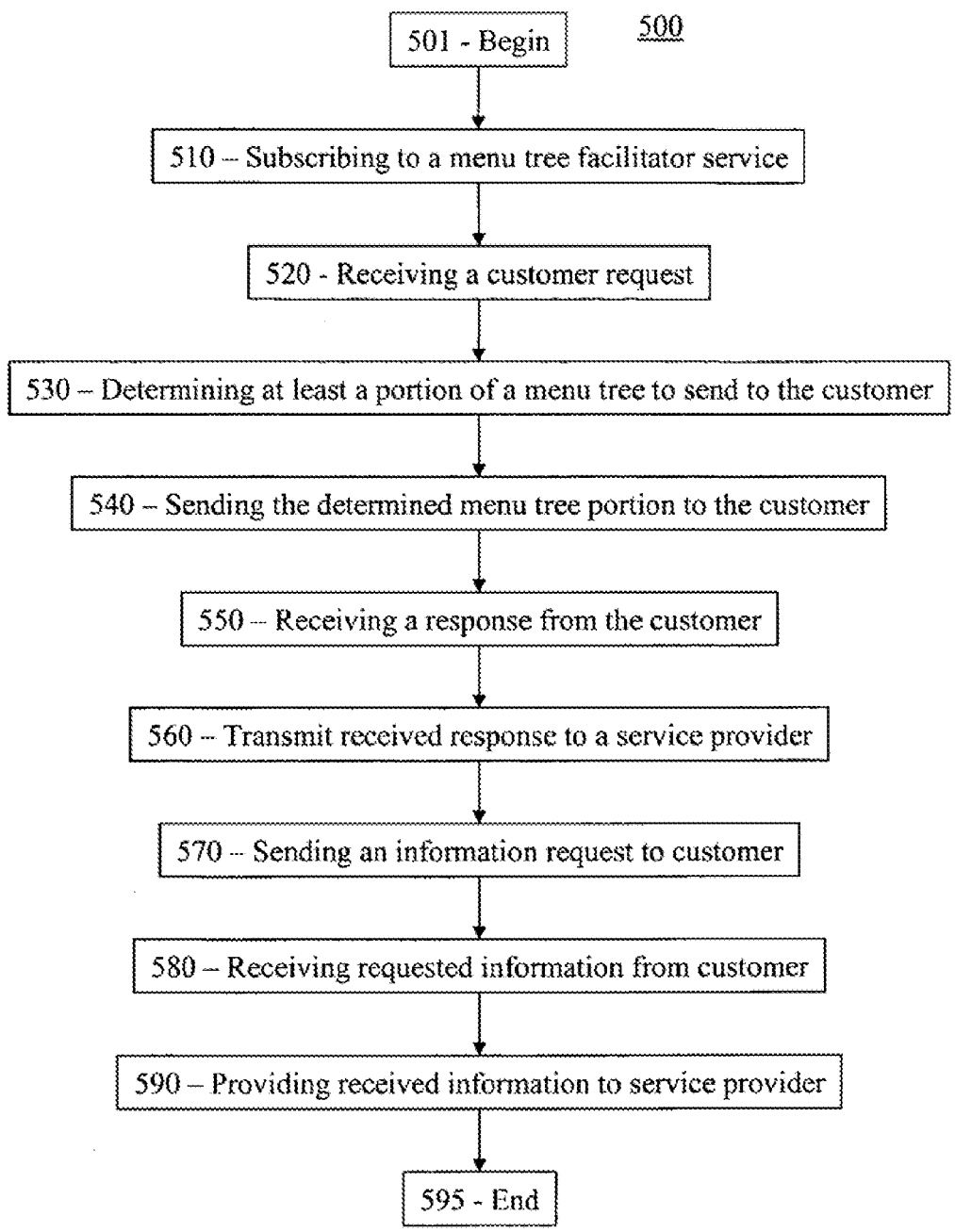
FIG. 5 is a flowchart representative of one embodiment of a method for facilitating the use of menu trees in accordance with the present invention.

FIG. 5 illustrates another embodiment of a method 500 for facilitating menu tree options of a service provider. Method 500 illustrates a method a customer may use to provide sensitive information to a service provider through a menu tree service center (MTSC). Method 500 begins at 501.

At step 510, a customer subscribes to a menu tree facilitator service MTFS prior to making a customer request. In one embodiment, the customer provides personal information such as, for example, residential address, telephone numbers and billing information. In another embodiment, the customer provides more detailed information such as, for example, bank account numbers, credit card numbers, credit card expiration dates and personal identification numbers. In one embodiment, the information provided comprises information that would be provided to a service provider to complete a transaction, such as the purchase of a good or service. In one embodiment, the menu tree facilitator service provides a secure method to keep this information secret when the information is used by a customer during a transaction. For example, in one embodiment, the MTFS associates each of the provided account numbers, credit card numbers and/or PIN numbers to a spoken word or phrase using voice recognition software located at the menu tree facilitator service. In an example, a customer provides a credit card number. Next, the customer is prompted by the MTFS to speak a word or phrase that is to be associated with this number. For example, a customer often uses his VISA® credit card to pay for goods and services ordered over the telephone. During enrollment, the customer recites the credit card number, then, when prompted, speaks the phrase "VISA CARD." The MTFS will then securely link the credit card number with the spoken phrase. In a similar manner, the customer can have credit card expiration dates, personal identification numbers, home telephone numbers and any other information a user would like to keep secure linked to a word or phrase.

The menu tree facilitator service then stores these associated numbers and phrases in a database for use by the customer during a transaction that is facilitated by the menu tree facilitator service.

At step 520, a customer request is received at a menu tree facilitator service center. In one embodiment, step 520 is implemented as in step 220. At step 530, at least a portion of the service provider menu tree to be sent to the customer is determined at the menu tree service center based on the received customer request. In one embodiment, step 530 is implemented as in step 230.

Next, at step 540, at least a portion of the service provider menu tree is sent to the mobile communication device. In one embodiment, step 540 is implemented as in step 240. At step 550, the MTSC receives a response from the mobile communication device based on the sent menu tree. In one embodiment, step 550 is implemented as in step 250. At step 560, the received response is transmitted to the service provider, thereby connecting the customer to the service provider at the desired menu item. In one embodiment, step 560 is implemented as in step 260.

At step 570, a request for personal information is sent to the customer. In one embodiment, the request is sent from the MTSC. In another embodiment, the request is sent from the service provider. In one embodiment, the request is for billing information, such as, for example, credit card information. In response to the request, the customer provides the necessary information, such as, for example, a credit card number and card expiration date. In one embodiment, the information is provided verbally by the customer. In one embodiment, the information provided by the customer is a spoken word or phrase. In an example, when the customer is prompted to provide a credit card number, the customer speaks the phrase "VISA CARD" instead of the actual credit card number.

At step 580, the requested information is received from the customer. In one embodiment, the information is received at the menu tree service center. As described above, the received information, i.e, the phrase "VISA CARD," was linked to the credit card number during enrollment. In response to the receipt of the spoken word or phrase ("VISA CARD") from the customer, the MTSC retrieves the information (credit card number) linked to the word or phrase that is stored on a MTSC database.

At step 590, the linked information is provided to the service provider. In one embodiment, the MTSC provides the linked information, for example, the credit card number, to the service provider in a secure manner so that the information cannot be intercepted by another party by, for example, tapping into the phone call. In one method of providing a secure transmission of information, the MTSC does not transmit the tones to the user that are dialed when the information is sent to the service provider. Method 500 ends at step 595.

In another embodiment of a method for providing secure information through a menu tree facilitator service, the method may be performed as described above for method 500 but also include additional steps. In one embodiment, the method includes a step where the MTSC logs and stores the transactions of the user at a menu tree facilitator database. In another embodiment, the method provides a manner of recognizing that a customer input is incorrect or invalid and provides a user the ability to return to the point in the menu where the incorrect or invalid information was provided. In one embodiment, the MTSC provides a verbal cue to the user to inform the user that incorrect or invalid information was provided and offers the user the option of returning to that point in the menu by verbalizing a response or pressing a button to return to the menu item.

Those with ordinary skill in the art will recognize that the methods described above may also be implemented using a personal computer or any other type of communication device. In other embodiments, the customer can subscribe to the service using a personal computer. In still other embodiments, the menu tree facilitator service is a fee-based service. In yet other embodiments, the menu tree facilitator service is a non-fee based service providing advertising links with the display text sent to the communication device.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of selecting a menu tree for display to a customer, the method comprising:
   a programmed service receiving from a customer via a client computer, registration of customer subscription data to receive a menu tree from a service provider, wherein the customer subscription data comprises a customer number linked to a spoken word or spoken phrase; and subsequently:
   responsive to a first request by the customer via the client computer to receive a menu tree from the service provider, the programmed service sending a second request to the client computer for the customer number;
   the programmed service receiving the spoken word or spoken phrase from the customer instead of the customer number and in response, the programmed service retrieving the customer number and sending the customer number to the service provider;
   the programmed service receiving from the service provider a presentation of the menu tree to forward to the client computer in response to the first request;
   determining one menu tree from a plurality of menu trees based on the first request, wherein each of the plurality of menu trees is associated with a different service provider;
   determining at least a portion of the determined menu tree based on the first request, wherein the portion is further determined based on at least one of a customer menu tree navigation record and a predetermined menu tree provided to the programmed service by the service provider and stored at the programmed service;
   sending the portion of the determined menu tree to the customer based on the portion;
   receiving a response from the customer at the programmed service based on the portion; and
   transmitting the response from the programmed service to the service provider.

2. The method of selecting a menu tree of claim 1, wherein the customer number and spoken word or spoken phrase is stored on a database at the programmed service.

3. The method of selecting a menu tree of claim 1, further comprising: receiving the first request by the customer at the programmed service, the first request including a customer identification.

4. The method of selecting a menu tree of claim 1, wherein the programmed service receiving the spoken word or spoken phrase from the customer instead of the customer number, is via a microphone on the client computer.

5. A computer program product of selecting a menu tree for display to a customer, the computer program product comprising: a computer readable storage device having computer readable program code embodied therewith, the computer readable program code comprising:
   computer readable program code to receive from a customer via a client computer, registration of customer subscription data to receive a menu tree from a service provider, wherein the customer subscription data comprises a customer number linked to a spoken word or spoken phrase; and subsequently:
   computer readable program code to send a second request to the client computer for the customer number, responsive to a first request by the customer via the client computer to receive a menu tree from the service provider;
   computer readable program code to receive the spoken word or spoken phrase from the customer instead of the customer number and in response, to retrieve the customer number and sending the customer number to the service provider; and
   computer readable program code to receive from the service provider a presentation of the menu tree to forward to the client computer in response to the first request;
   computer readable program code to determine one menu tree from a plurality of menu trees based on the first request, wherein each of the plurality of menu trees is associated with a different service provider;
   computer readable program code to determine at least a portion of the determined menu tree based on the first request, wherein the portion is further determined based on at least one of a customer menu tree navigation record and a predetermined menu tree provided to the programmed service by the service provider and stored at the programmed service;
   computer readable program code to send the portion of the determined menu tree to the customer based on the portion;
   computer readable program code to receive a response from the customer at the programmed service based on the portion; and
   computer readable program code to transmit the response from the programmed service to the service provider.

6. The computer program product of selecting a menu tree of claim 5, wherein the customer number and spoken word or spoken phrase is stored on a database at the programmed service.

7. The computer program product of selecting a menu tree of claim 5, further comprising:
   computer readable program code to receive the first request by the customer at the programmed service, the first request including a customer identification.

8. The computer program product of selecting a menu tree of claim 5, wherein the computer readable program code to receive the spoken word or spoken phrase from the customer instead of the customer number, is via a microphone on the client computer.

9. A data processing system for selecting a menu tree for display to a customer, the data processing system comprising:
   one or more processors, one or more computer-readable memories, one or more computer-readable storage devices, and program instructions stored on at least one of the one or more storage devices for execution by at least one of the one or more processors via at least one of the one or more memories, the program instructions comprising:
   computer usable code to receive from a customer via a client computer, registration of customer subscription data to receive a menu tree from a service provider, wherein the customer subscription data comprises a customer number linked to a spoken word or spoken phrase; and subsequently:
   send a second request to the client computer for the customer number, responsive to a first request by the customer via the client computer to receive a menu tree from the service provider;
   receive the spoken word or spoken phrase from the customer instead of the customer number and in response, the programmed service retrieving the customer number and sending the customer number to the service provider;

receive from the service provider a presentation of the menu tree to forward to the client computer in response to the first request;

determine one menu tree from a plurality of menu trees based on the first request, wherein each of the plurality of menu trees is associated with a different service provider;

determine at least a portion of the determined menu tree based on the first request, wherein the portion is further determined based on at least one of a customer menu tree navigation record and a predetermined menu tree provided to the programmed service by the service provider and stored at the programmed service;

send the portion of the determined menu tree to the customer based on the portion;

receive a response from the customer at the programmed service based on the portion; and transmit the response from the programmed service to the service provider.

10. The data processing system of selecting a menu tree of claim 9, wherein the customer number and spoken word or spoken phrase is stored on a database at the programmed service.

11. The data processing system of selecting a menu tree of claim 9, wherein the program instructions further comprise computer usable code to receive the first request by the customer at the programmed service, the first request including a customer identification.

12. The data processing system of selecting a menu tree of claim 9, wherein the computer usable code to receive the spoken word or spoken phrase from the customer instead of the customer number, is via a microphone on the client computer.

* * * * *